(12) United States Patent
Xiao et al.

(10) Patent No.: US 12,011,662 B2
(45) Date of Patent: Jun. 18, 2024

(54) INTERFACE DISPLAY METHOD, APPARATUS, TERMINAL, AND STORAGE MEDIUM

(71) Applicant: TENCENT TECHNOLOGY (SHENZHEN) COMPANY LIMITED, Guangdong (CN)

(72) Inventors: Hang Xiao, Guangdong (CN); Yuan Fu, Guangdong (CN); Zhenfa Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 216 days.

(21) Appl. No.: 17/508,452

(22) Filed: Oct. 22, 2021

(65) Prior Publication Data

US 2022/0040575 A1 Feb. 10, 2022

Related U.S. Application Data

(63) Continuation of application No. PCT/CN2021/100969, filed on Jun. 18, 2021.

(30) Foreign Application Priority Data

Jul. 24, 2020 (CN) .......................... 202010721105.1

(51) Int. Cl.
*A63F 13/5372* (2014.01)
*A63F 13/52* (2014.01)
(Continued)

(52) U.S. Cl.
CPC .......... *A63F 13/5372* (2014.09); *A63F 13/52* (2014.09); *A63F 13/533* (2014.09);
(Continued)

(58) Field of Classification Search
CPC .... A63F 13/5372; A63F 13/52; A63F 13/533; A63F 13/5378; A63F 13/822;
(Continued)

(56) References Cited

U.S. PATENT DOCUMENTS 11,226,722 B2 * 1/2022 Shen ................... G06F 3/04815
2010/0273544 A1 10/2010 Koganezawa et al.
(Continued)

FOREIGN PATENT DOCUMENTS

| CN | 107450812 A | 12/2017 |
| CN | 110064193 A | 7/2019 |

(Continued)

OTHER PUBLICATIONS

Singapore Search Report dated Mar. 6, 2023 in Singapore Application No. 11202110867U.

(Continued)

*Primary Examiner* — Ronald Laneau
(74) *Attorney, Agent, or Firm* — Sughrue Mion, PLLC

(57) ABSTRACT

A method of controlling a display includes displaying a virtual environment and a target operation controller, the target operation controller being configured to control a first virtual object to perform a target operation; displaying an indication graph of the target operation in response to a touch operation to the target operation controller, the indication graph indicating an effective range of the target operation; and marking, based on a hittable virtual object being in the effective range of the target operation, the hittable virtual object being in a map display window, the map display window displaying a map of the virtual environment.

17 Claims, 7 Drawing Sheets

(51) Int. Cl.
  *A63F 13/533* (2014.01)
  *A63F 13/5378* (2014.01)
  *A63F 13/822* (2014.01)
  *G06F 3/04817* (2022.01)
  *G06F 3/0482* (2013.01)
  *G06F 3/04883* (2022.01)

(52) U.S. Cl.
  CPC ...... *A63F 13/5378* (2014.09); *G06F 3/04817* (2013.01); *G06F 3/0482* (2013.01); *G06F 3/04883* (2013.01); *A63F 13/822* (2014.09); *A63F 2300/306* (2013.01); *A63F 2300/307* (2013.01); *A63F 2300/308* (2013.01); *A63F 2300/807* (2013.01)

(58) Field of Classification Search
  CPC .......... A63F 2300/306; A63F 2300/307; A63F 2300/308; A63F 2300/807; A63F 13/2145; A63F 13/537; G06F 3/04817; G06F 3/0482; G06F 3/04883
  See application file for complete search history.

(56) References Cited

U.S. PATENT DOCUMENTS

| | | | |
|---|---|---|---|
| 2014/0171196 A1 | 6/2014 | Coyle | |
| 2018/0028918 A1 | 2/2018 | Tang et al. | |
| 2020/0338449 A1* | 10/2020 | Fan | A63F 13/837 |
| 2021/0228986 A1* | 7/2021 | Chan | A63F 13/822 |
| 2023/0033874 A1* | 2/2023 | Wen | A63F 13/822 |
| 2023/0107414 A1* | 4/2023 | Hu | H04N 21/8146 463/31 |

FOREIGN PATENT DOCUMENTS

| | | | |
|---|---|---|---|
| CN | 109248439 B | 12/2019 | |
| CN | 110694261 A | 1/2020 | |
| CN | 111035918 A | 4/2020 | |
| CN | 111228807 A | 6/2020 | |
| CN | 111821691 A | 10/2020 | |
| EP | 3 273 334 A1 | 1/2018 | |
| JP | 2019-209115 A | 12/2019 | |

OTHER PUBLICATIONS

Written Opinion dated Mar. 9, 2023 in Singapore Application No. 11202110867U.
Extended European Search Report dated Jul. 1, 2022 in European Application No. 21782868.0.
Written Opinion for PCT/CN2021/100969, dated Sep. 15, 2021.
International Search Report for PCT/CN2021/100969, dated Sep. 15, 2021.
Screen Operation [Attorney's counsel wiki], [online], 2019, Jan. 24, 2007, Retrieved from the Internet: https://oujyaeiyo.xyz/beginner/screenoperation (5 pages total).
Jasuji, a technical judge of the Japan Patent Office (JPO), Koji Shoji, [online], Jan. 5, 2017, Retrieved from the Internet: http://www.qieyou.com/wzry/201701/27631.html (2 pages total).
Office Action dated Nov. 14, 2022 in Japanese Application No. 2021-563355.
Korean Office Action dated Sep. 6, 2023 in Korean Application No. 10-2021-7034215.
Gaming Theos, "Perfect Use of Mini Map | Map Awareness & Farming Guide | Mobile Legends Bang Bang", Youtube.com/watch?v=jq35rGBhpns, Mar. 24, 2019 (1 page total).
Speed Snail, "The Honor of Kings experience server will be updated on Apr. 14 and the team competition mode will be launched", http://www.87g.com/wzry/14886.html, 2016 (43 pages total).
Aion Inven, ""First-attack monster recognition distance" varies depending on level", https://www.inven.co.kr/board/aion/1601/31, 2007 (6 pages total).
Translation of International Search Report dated Sep. 15, 2021 in International Application No. PCT/CN2021/100969.
Translation of Written Opinion dated Sep. 15, 2021 in International Application No. PCT/CN2021/100969.

* cited by examiner

INTERFACE DISPLAY METHOD, APPARATUS, TERMINAL, AND STORAGE MEDIUM

RELATED APPLICATION

This application is a bypass continuation of International Patent Application No. PCT/CN2021/100969 filed on Jun. 18, 2021, which claims priority from Chinese Patent Application No. 202010721105.1, filed in the Chinese Patent Office on Jul. 24, 2020, and entitled "INTERFACE DISPLAY METHOD, APPARATUS, TERMINAL, AND STORAGE MEDIUM," which are incorporated herein by reference in their entireties.

BACKGROUND

1. Field

Methods and apparatuses consistent with example embodiments relate to computer and Internet technologies, and in particular, to an interface display technology.

2. Description of Related Art

When playing a computer game, a user may control a first virtual object to initiate an attack on a hostile virtual object in that is in a different camp than the first virtual object.

When the first virtual object uses a skill to attack a hostile virtual object outside a screen display picture, the user may comprehensively observe an attack range of the skill by sliding a game picture, and then control the first virtual object to cast the skill when determining that the skill can attack the hostile virtual object.

However, in the foregoing gameplay, the user needs to slide the display picture to learn whether the skill is aimed at the hostile virtual object located outside the screen display picture, so that the operation is complex and slow.

SUMMARY

According to example embodiments, a method of controlling a display includes displaying a virtual environment and a target operation controller, the target operation controller being configured to control a first virtual object to perform a target operation; displaying an indication graph of the target operation in response to a touch operation to the target operation controller, the indication graph indicating an effective range of the target operation; and marking, based on a hittable virtual object being in the effective range of the target operation, the hittable virtual object being in a map display window, the map display window displaying a map of the virtual environment.

According to example embodiments, a display apparatus may include: at least one memory configured to store computer program code; and at least one processor configured to access the at least one memory and operate according to the computer program code. The computer program code may include a first display code configured to cause the at least one processor to display a virtual environment and a target operation controller, the target operation controller being configured to control a first virtual object to perform a target operation; a second display code configured to cause the at least one processor to display an indication graph of the target operation in response to a touch operation to the target operation controller, the indication graph indicating an effective range of the target operation; and a marking code configured to cause the at least one processor to mark, based on a hittable virtual object being in the effective range of the target operation, the hittable virtual object being in a map display window, the map display window displaying a map of the virtual environment.

According to example embodiments, a non-transitory computer-readable storage medium may store instructions that cause a processor of a display apparatus to: display a virtual environment and a target operation controller, the target operation controller being configured to control a first virtual object to perform a target operation; display an indication graph of the target operation in response to a touch operation to the target operation controller, the indication graph indicating an effective range of the target operation; and mark, based on a hittable virtual object being in the effective range of the target operation, the hittable virtual object being in a map display window, the map display window displaying a map of the virtual environment.

DESCRIPTION OF EXAMPLE EMBODIMENTS

The following describes implementations of this application in detail with reference to the accompanying drawings.

Figure 1:
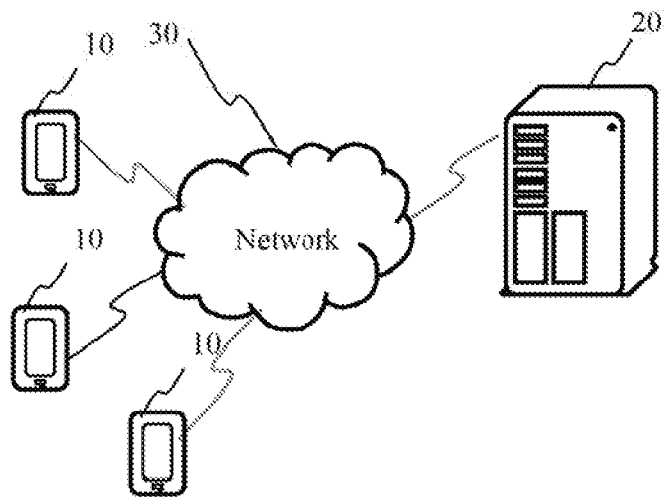
FIG. 1 is a schematic diagram of a running environment of an application according to example embodiments.

FIG. 1 is a schematic diagram of a running environment of an application according to example embodiments. The running environment of the application may include a terminal 10 and a server 20.

The terminal 10 may be an electronic device such as a mobile phone, a tablet computer, a game console, an ebook reader, a multimedia player, a wearable device, or a personal computer (PC). A client of an application may be installed on the terminal 10. The application may be an application that needs to be downloaded and installed, or may be a click-to-use application, and this is not limited in this embodiment of this application.

According to an embodiment, the application may be any application that can provide a virtual environment for a virtual object substituted and operated by a user to perform activities in the virtual environment. Typically, the application is a game application, such as a multiplayer online battle arena (MOBA) game, a battle royale (BR) game, and a third-person shooting game (TPS), a first-person shooting game (FPS) or a multiplayer gun battle survival game. Certainly, in addition to the game applications, another type of application may also present a virtual object to a user and provide a corresponding function for the virtual object. For example, the foregoing application may be a virtual reality (VR) application, an augmented reality (AR) application, a three-dimensional (3D) map application, a military simulation application, a social application, an interactive entertainment application, or the like. However, the disclosure is not limited in the listed example embodiments. Virtual objects provided in different applications may have different forms and corresponding functions, which may be preset according to an actual requirement, and are not limited by the disclosed example embodiments. A client of the foregoing application may be run on the terminal 10. In some embodiments, the application is an application developed based on a 3D virtual environment engine. For example, the virtual environment engine is a Unity engine. The virtual environment engine may construct a 3D virtual environment, virtual objects, virtual props, and the like, to bring a more immersive gaming experience to the user.

The foregoing virtual environment may be a scene displayed (or provided) when a client of an application (such as a game application) runs on a terminal. The virtual environment may refer to a scene created for a virtual object to perform activities (such as game competition), such as a virtual house, a virtual island, a virtual map, or a virtual building. The virtual environment may be a simulated environment of a real world, or may be a semi-simulated and semi-fictional environment, or may be a completely fictional environment. The virtual environment may be a two-dimensional (2D) virtual environment, a 2.5-dimensional virtual environment, or a 3D virtual environment, and is not limited to these listed examples.

The foregoing virtual object may be a virtual character controlled by a user account in an application, or may be a virtual character controlled by a computer program in the application. For example, the application is a game application. The virtual object may be a game character controlled by the user account in the game application, or may be a game monster controlled by a computer program in the game application. The virtual object may be in a human form, an animal form, a cartoon form, or another form, and is not limited to these listed examples. The virtual object may be presented in a 3D form or a 2D form, and is not limited to these listed examples. In a case that the virtual environment is a 3D virtual environment, the virtual object may be a 3D model created based on a skeletal animation technology. Each virtual object may have a respective shape and size in the 3D virtual environment, and may occupy some space in the 3D virtual environment.

According to an example embodiment, the foregoing virtual objects include virtual objects in the same camp and virtual objects in different camps, that is, in the application, the virtual objects may be divided into different camps. According to an example in which the game is a MOBA game, ten users are divided into a red team and a blue team to play a game, in which five people form each team. In this case, the red team and virtual objects in the red team are in the same camp and are teammates, the blue team and virtual objects in the blue team are in the same camp and are teammates, and the virtual objects in the red team and the blue team are in different camps and are in a hostile relationship.

According to an example embodiment, the user account may control a first virtual object to attack a second virtual object. The first virtual object and the second virtual object may be in different camps and in a hostile relationship. The user account controls the first virtual object to cast a skill to attack the second virtual object. According to an example embodiment, in a process of preparing to cast a skill by the first virtual object, the terminal 10 obtains an effective range of the skill and the second virtual object within the effective range. The terminal 10 marks the effective range and the second virtual object within the effective range on a map display window of a UI.

The server 20 may be configured to provide a backend service for the client of the application in the terminal 10. For example, the server 20 may be a backend server of the application. The server 20 may be one server, a server cluster including a plurality of servers, or a cloud computing service center. The server 20 may provide backend services for applications in a plurality of terminals 10. The terminal 10 may communicate with the server 20 through a network 30.

Figure 2:
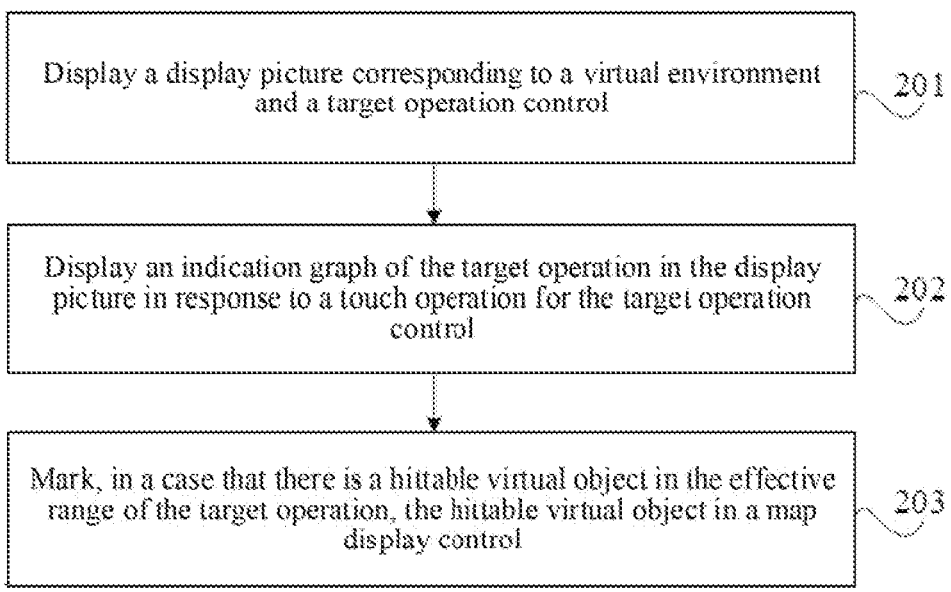
FIG. 2 is a flowchart of an interface display method according to example embodiments.

FIG. 2 is a flowchart of an interface display method according to example embodiments. The method may be applied to a terminal. For example, an execution entity of each operation may be the terminal 10 (referred to as the "client" below) in the running environment of the application shown in FIG. 1. The method may include the following operations (201 to 205):

Operation 201: Display a display picture corresponding to a virtual environment and a target operation controller.

A virtual environment may be a scene created by an application for virtual objects to perform activities. The virtual environment may include virtual islands, virtual maps, and virtual buildings. A user may control a virtual object to interact with the virtual environment through a user account, such as entering a virtual building in the virtual environment, and attacking other virtual objects in the virtual environment. The application may be an application that needs to be downloaded and installed, or may be a click-to-use application.

The display picture may be a picture on which the virtual environment is displayed to the user on the UI. The display picture may be a picture captured by a virtual camera from the virtual environment. According to an example embodiment, the virtual camera obtains a picture of the virtual environment from a third perspective. The virtual camera may be set obliquely above the first virtual object. The client may use the virtual camera to observe the virtual environment with the first virtual object as the center, may obtain a picture of the virtual environment with the first virtual object as the center, may generate the display picture corresponding to the virtual environment, and may display the display picture corresponding to the virtual environment in the UI. According to another example embodiment, the virtual camera obtains a picture of the virtual environment from a first perspective. The virtual camera may be set directly in front of the first virtual object. The client may observe the virtual environment from the perspective of the first virtual object, may obtain a picture of the virtual environment with the first virtual object as the first perspective, may generate the display picture corresponding to the virtual environment, and may display the picture corresponding to the virtual environment in the UI. According to an example embodiment, the placement position of the virtual camera may be adjustable in real time. The user may adjust the location of the virtual camera through a control operation for the UI, and then observe the display picture corresponding to the virtual environment at different locations. For example, the user may adjust the location of the virtual environment through a picture operation (such as a drag operation) for the UI. The UI is a picture of the foregoing application displayed to the user on the client.

According to an example embodiment, after receiving a user-triggered start instruction for the application, the client may control the application to run, and upon receiving a game start instruction, may control the virtual camera to display the display picture corresponding to the virtual environment in the UI. While displaying the display picture corresponding to the virtual environment, the client may display the target operation controller in the UI. The target operation controller may be configured to control the first virtual object to perform a target operation. For example, the user may click/tap the target operation controller to control the first virtual object to perform the target operation, or may press a key (for example, the R key) corresponding to the target operation controller to control the first virtual object to perform the target operation. According to other example embodiments, target operations corresponding to the target operation controller are different.

According to an example embodiment, the target operation is to cast a skill, that is, the target operation controller is configured to control the first virtual object to cast a skill. For example, after receiving an execution instruction of the target operation, the client controls the first virtual object to cast a skill corresponding to the target operation controller. In actual application, the UI may include a plurality of operation controls for casting skills, and different operation controls may be configured to cast different skills.

According to an example embodiment, the target operation is to use a virtual item, that is, the target operation controller is configured to control the first virtual object to use the virtual item, such as a virtual prop or a virtual weapon. For example, after receiving the execution instruction of the target operation, the client may control the first virtual object to use a corresponding virtual prop. In actual application, the UI may include a plurality of operation controls for using virtual props, and different operation controls may be configured to use different virtual props.

According to an example embodiment, the target operation is state switching, that is, the target operation controller is configured to control the first virtual object to switch to a state. For example, after receiving the instruction to execute the target operation, the client controls the first virtual object to switch to a target state. In actual application, the UI may include a plurality of operation controls. Different operation controls may correspond to different states. The same operation control may also correspond to different states. For example, for an operation control, if the user clicks/taps the operation control once, the first virtual object is controlled to switch to a forward jumping state; and if the user clicks/taps the operation control twice, the first virtual object is controlled to switch to a backward jumping state.

In actual application, the application may configure the target operation corresponding to the target operation controller according to an actual situation, but is not limited in this example embodiment.

Operation 202: Display an indication graph of the target operation in the display picture in response to a touch operation for the target operation controller.

The touch operation may be an operation of the user at any location on the UI. According to an example embodiment, the touch operation is an operation performed by the user for the target operation controller. For example, the user may perform the touch operation of the target operation controller by clicking/tapping the target operation controller in the UI, or may perform the touch operation of the target operation controller by pressing a corresponding key on the keyboard (for example, the R key).

According to an example embodiment, after displaying the UI of the application, the client may monitor the UI, and after detecting a touch operation in the UI, obtain a trigger position of the touch operation. When the trigger position is in a trigger region of the target operation controller, it may be determined that the touch operation is a touch operation for the target operation controller.

According to an example embodiment, a location of each operation control in the UI is fixed, and a fixed trigger region of each operation control is set in the application. The fixed trigger region may be any location in the UI, for example, the fixed trigger region of the target operation controller is a surrounding region of the target operation controller. For example, the client may determine, according to the trigger position, whether the touch operation is located in the fixed trigger region of the target operation controller. If the touch operation is located in the fixed trigger region of the target operation controller, it is determined that the touch operation is the touch operation of the target operation controller.

According to an example embodiment, the location of each operation control in the UI is adjustable, that is, the user may adjust the location of each operation control in the UI according to an actual situation. In this case, an activity trigger region of each operation control is set in the application. The activity trigger region may be any region based on the location of the target operation controller. For example, the activity trigger region of the target operation controller is a region that is spaced from a center position of the target operation controller by a distance less than a target value. For example, the client may determine a distance between the trigger position and the center position of the target operation controller according to the trigger position. If the distance is less than the target value, it is determined that the touch operation is the touch operation of the target operation controller.

In a case that the client detects the touch operation for the target operation controller, the indication graph of the target operation may be displayed on the display picture. The indication graph may be used for indicating an effective range of the target operation, and the effective range may be an actual influence range of the target operation, such as an attack range of an attack skill, a throwing position of a virtual prop, or a jumping impact range of a virtual object.

According to an example embodiment, the indication graph may also be referred to as a surface indicator, and the surface indicator may be configured to indicate an effective range of the target operation on the ground of the virtual environment. After detecting the touch operation for the target operation controller, the client may obtain the effective range of the target operation corresponding to the target operation controller, and map the effective range to the ground of the virtual environment in the form of an indication graph, to further display the indication graph of the target operation on the display picture.

Figure 3:
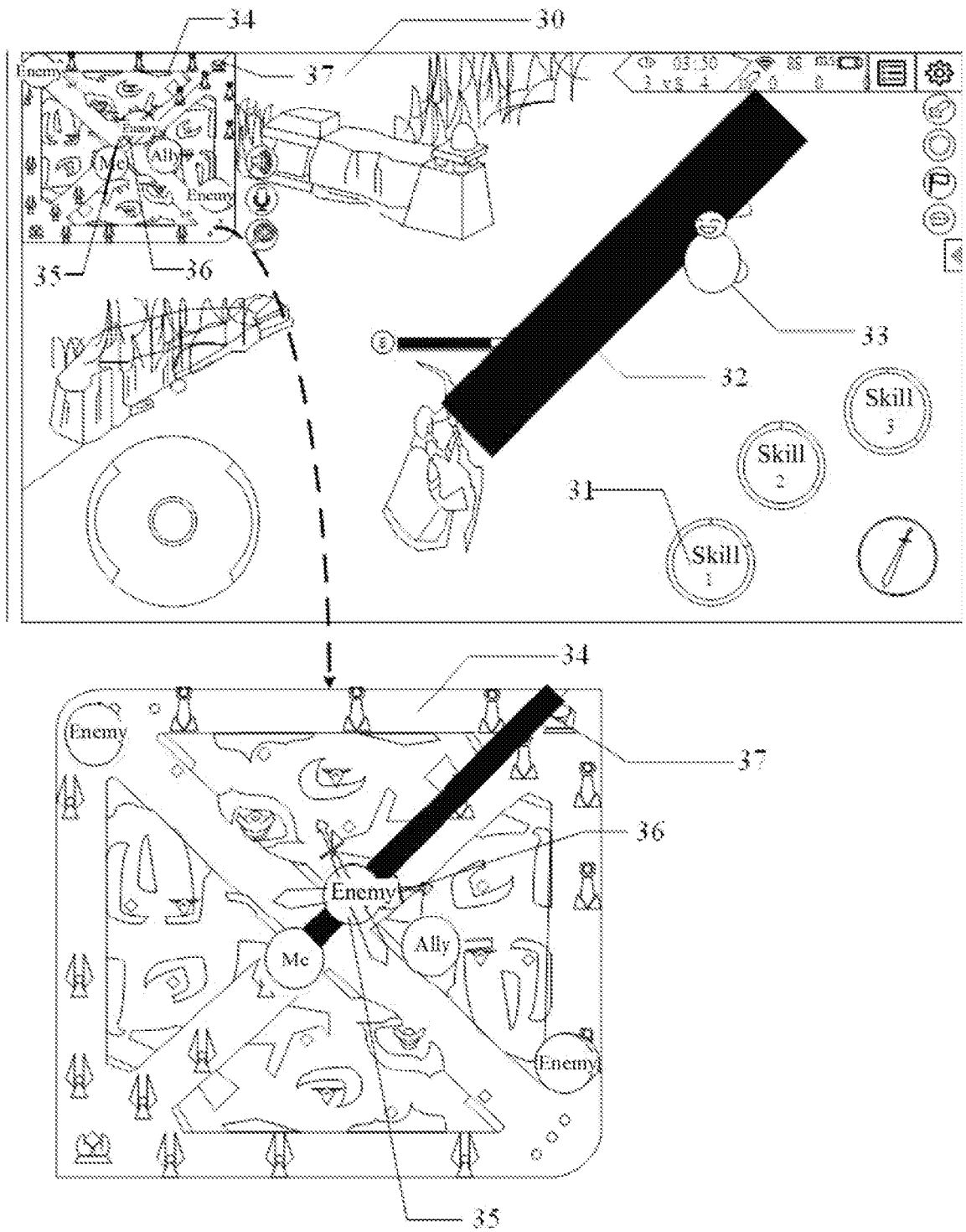
FIG. 3 is a schematic exemplary diagram of a UI according to example embodiments.

For example, referring to FIG. 3, in a UI 30, after detecting a touch operation on a target operation controller 31, the client displays an indication graph 32 of an effective range of a target operation corresponding to the target operation controller 31 on the ground of the virtual environment.

The effective range may be an influence range of the target operation, or may be an intersection range of the influence range of the target operation and a screen region of the client, but is not limited in this example embodiment.

Operation 203: Mark, in a case that there is a hittable virtual object in the effective range of the target operation, the hittable virtual object in a map display window.

The hittable virtual object may be used for indicating a virtual object to which the target operation is targeted and that has a hit probability. After determining the effective range of the target operation, the client may predict an influence target of the target operation according to the effective range, and may determine the hittable virtual object corresponding to the target operation.

According to an example embodiment, different target operations are targeted at different virtual objects. For example, the target operation has an attack attribute, so that the virtual object targeted by the target operation is a virtual object in a hostile camp of the first virtual object. In another example, the target operation has a gain attribute, so that the virtual object targeted by the target operation is a virtual object in the same camp of the first virtual object. After determining the effective range of the target operation, the client determines that the virtual object within the effective range is a virtual object with a hit probability, and traverses the virtual object with a hit probability. If the virtual object with a hit probability is the virtual object targeted by the target operation, it is determined that there is a hittable virtual object in the effective range of the target operation. After determining the effective range of the target operation controller, the client may further obtain location information of the virtual object targeted by the target operation in the virtual environment according to attribute information of the target operation, and determine, according to the location information, whether there is a hittable virtual object in the effective range.

Figure 4:
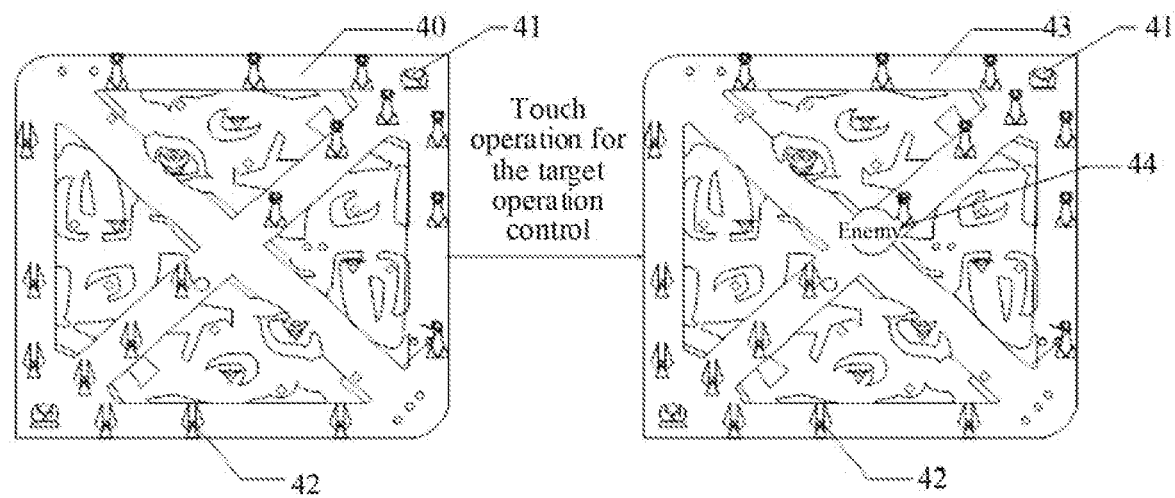
FIG. 4, FIG. 5, and FIG. 6 are schematic exemplarily diagrams of map display controls according to example embodiments.

According to an example embodiment, when there is a hittable virtual object in the effective range of the target operation, the client marks the hittable virtual object in the map display window. The map display window may be a UI control configured to display a virtual environment map. The virtual environment map may be used for expressing spatial distribution, connection, a quantity, and quality features, development and change states in time of various things in the virtual environment. The map displayed in the map display window may be in the 2D or 3D form, to quickly and intuitively reflect the current virtual environment to the user, so that the user can formulate use strategies and implement operations. A game application is used as an example. The map display window may also be referred to as a map or a minimap, which is used for displaying terrain and landforms of the virtual environment provided in the game application in the 2D or 3D form, such as positions of a base camp, an offensive line, a defensive tower, a river channel, and a tree. For example, as shown in FIG. 4, a map display window 40 includes a first virtual building 41 and a second virtual building 42 in a virtual environment. A presentation picture of the map display window may be a dynamic picture that changes in real time. For example, when a virtual building in the virtual environment is destroyed, the presentation picture of the map display window is updated, and the updated map display window includes ruins left after the virtual building is destroyed. According to an example embodiment, the map display window may include icons of virtual objects in the virtual environment, and the client may add a mark on an icon of the hittable virtual object when marking the hittable virtual object. According to an example embodiment, the map display window may not include the icons of the virtual objects in the virtual environment. The client may add the icon of the hittable virtual object to the map display window when marking the hittable virtual object, thereby marking the hittable virtual object.

The map display window may display a global map of the virtual environment or a partial map of the virtual environment, but is not limited in this example embodiment. For example, if the user needs to monitor a part of the virtual environment in real time, the user may set the map display window. After obtaining a display parameter corresponding to the map display window, the client controls the map display window to display only part of the virtual environment set by the user.

The map display window may be a UI operation control, which can receive and respond to user operations, such as responding to clicking/tapping, dragging, and zooming operations.

According to an example embodiment, the user may control a display style of the map display window in the UI through a control operation for the map display window. For example, the user may control the zoom-in or zoom-out display of the map display window through a click/tap operation or by sliding a mouse wheel. Certainly, to facilitate user operation, the map display window may be set with a default display scale, and the user may control the map display window to be displayed at the default display scale by a click/tap operation. The map display window displayed at the default display scale may include the global map of the virtual environment or the partial map set by the user. According to another example, the user controls, by clicking/tapping a location on the virtual environment map in the map display window, the map display window to display a virtual environment map corresponding to the location. When receiving the click/tap operation, the client switches the presentation picture of the map display window to a display picture of the virtual environment map centered on the location.

According to another example, the user may switch from the currently displayed virtual environment picture to a virtual environment picture corresponding to the location through the map display window, to observe a real-time situation of the location in the virtual environment. If the user clicks on a location of the map display window, correspondingly, after receiving a click/tap operation for the location, the client switches the display picture of the virtual environment to a display picture corresponding to the location. The display picture corresponding to the location does not include the foregoing first virtual object. The user may alternatively switch the display picture corresponding to the virtual environment in the UI through a drag operation for the map display window. After receiving the drag operation for the map display window, the client switches the display picture corresponding to the virtual environment in the UI to the display picture corresponding to the virtual environment indicated by the current virtual environment map according to the current virtual environment map displayed in the map display window.

The map display window may be displayed in the UI when the display picture corresponding to the virtual environment is displayed, or may be displayed in the UI when it is determined that there is a hittable virtual object in the effective range of the target operation, but not limited by these example embodiments. According to other example embodiments, the map display window may be hidden, and a map display window icon may be displayed on the UI after hiding. The user may restore the display of the map display window by operating the map display window icon.

The map display window may be displayed at any position in the UI, where the any position may be a position set by a designer or a position set by the user, but is not limited by this example embodiment.

As such, in a case that there is a hittable virtual object in the effective range of the target operation, the hittable virtual object may be marked in the map display window, to implement visualization of the hittable virtual object corresponding to the target operation in the map display window, to provide a possibility for the target operation to accurately hit a virtual object outside a screen display picture, to reduce interactions between a user and the terminal, greatly reduce resource consumption of the terminal, and to improve a running speed of the game. In addition, due to the visualization of the hittable virtual object corresponding to the target operation in the map display window, sliding operations of the user on the display picture when attacking a hostile virtual object outside the screen display picture may be reduced. The operation is simple and can be performed quickly with few steps. The user can directly obtain an influence target of the target operation by using the map display window, reducing a probability of an operation error of the target operation, and ensuring the accuracy of the target operation.

The following describes the specific marking method of the hittable virtual object.

According to an example embodiment, the map display window includes icons of virtual objects in the virtual environment, and the client may display hittable prompt information corresponding to an icon of a second virtual object in the map display window. The second virtual object is the hittable virtual object corresponding to the target operation. In this case, the foregoing operation 203 includes the following example operations:

Example operation 203-1a. Determine a virtual object list according to location information of virtual objects in the virtual environment and the effective range of the target operation.

The location information of the virtual object may be used for indicating a position of the virtual object in the virtual environment. The location information of the virtual object may include position coordinates of the virtual object. According to this example embodiment, after determining the effective range of the target operation, the client obtains the location information of the virtual objects in the virtual environment, screens out virtual objects within the effective range according to the location information of the virtual objects, and determines the virtual object list corresponding to the target operation. The virtual object list includes a target virtual object in the effective range of the target operation.

The target virtual object may be a virtual object targeted by the target operation. According to an example embodiment, the client may determine the target virtual object according to attribute information of the target operation, and the attribute information may include an attack attribute, an auxiliary attribute, and the like. For example, if the target operation has the attack attribute, the target virtual object is a virtual object in a hostile camp of the first virtual object; if the target operation has the auxiliary attribute, the target virtual object is a virtual object in the same camp as the first virtual object; and if the target operation has both the attack attribute and the auxiliary attribute, the target virtual object is a global virtual object in the virtual environment.

According to an example embodiment, after detecting the touch operation for the target operation controller, the client may obtain the attribute information of the target operation corresponding to the target operation controller, determine the target virtual object corresponding to the target operation, obtain the location information of the target virtual object, determine the target virtual object in the effective range according to the location information of the target virtual object and the effective range of the target operation, and generate the virtual object list.

Example operation 203-2a. Obtain a list of icons in a display state in the map display window.

The list of icons may include icons of virtual objects. The icon may be used for representing a corresponding virtual object, and the icon may be a profile picture of the virtual object, a name of the virtual object, a user account name of the virtual object, or the like. According to an example embodiment, after determining the virtual object list, the client may obtain the list of icons in the display state in the map display window. When a virtual object is not blocked by an obstacle, an icon of the virtual object in the map display window is in a display state; and when the virtual object is blocked by an obstacle, the icon of the virtual object in the map display window is in a non-display state. The obstacle may be any virtual item in the virtual environment that blocks the perspective of the virtual object, or may be a virtual item with a shielding function set by the designer in the virtual environment, and this is not limited in this embodiment of this application.

Example operation 203-3a. Traverse the virtual objects corresponding to the icons in the list of icons, to determine whether a virtual object corresponding to an icon in the list of icons is in the virtual object list.

According to an example embodiment, after obtaining the list of icons, the client traverses the virtual objects corresponding to the icons in the list of icons, and determines whether the virtual object is in the virtual object list.

Example operation 203-4a. Determine that the virtual object corresponding to the icon is the second virtual object in a case that the virtual object corresponding to the icon is in the virtual object list, and display hittable prompt information corresponding to an icon of a second virtual object in the map display window.

According to an example embodiment, after traversing the virtual objects corresponding to the icons in the list of icons, the client determines that the virtual object corresponding to the icon is the second virtual object in a case that the virtual object corresponding to the icon is in the virtual object list, and displays the hittable prompt information corresponding to the icon of the second virtual object in the map display window. The hittable prompt information may be used for indicating that the second virtual object is the hittable virtual object. According to an example embodiment, the hittable prompt information is an indication identifier. For example, the client may add an indication identifier on the icon of the second virtual object, and the indication identifier is used for indicating that the second virtual object is a hittable virtual object. As shown in FIG. 3, after determining a second virtual object 33, the client adds an indication identifier 36 to an icon 35 of the second virtual object in a map display window 34 to indicate that the second virtual object 33 is a hittable virtual object (enemy). According to another example embodiment, the hittable prompt information is color information. Correspondingly, the client may add any color to the icon of the second virtual object, and the color may be used for indicating that the second virtual object is a hittable virtual object.

According to an example embodiment, the client cancels the display of the hittable prompt information corresponding to the icon of the second virtual object in the map display window in a case that the second virtual object is not the hittable virtual object.

According to an example embodiment, after marking the second virtual object, the client monitors the position of each virtual object in the virtual environment. If the second virtual object moves outside the effective range, it is determined that the second virtual object is not a hittable virtual object, and the display of the hittable prompt information corresponding to the icon of the second virtual object is canceled (or ended) in the map display window. If there is another target object that moves to the effective range, the another target object is determined to be the second virtual object, and the hittable prompt information corresponding to the icon of the second virtual object is displayed in the map display window.

According to an example embodiment, the client detects that the touch operation for the target operation controller disappears, and then determines that the second virtual object is not a hittable virtual object, and cancels the display of the hittable prompt information corresponding to the icon of the second virtual object in the map display window. The touch operation of the target operation controller may disappear when the user stops the touch operation for the target operation controller, or may disappear when the user triggers the generation of an interception instruction for the target operation controller. The interception instruction is an instruction generated through an operation cancellation control corresponding to the target operation in the UI when the user aborts the execution of the target operation.

Figure 5:
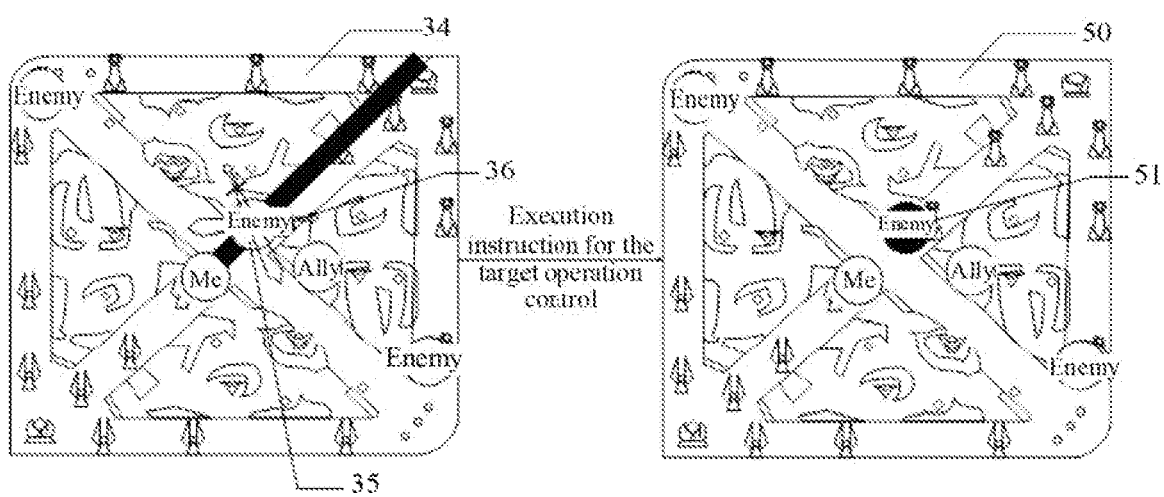

According to an example embodiment, if the client receives an execution instruction for the target operation, hit prompt information corresponding to the icon of the second virtual object is displayed in the map display window. The execution instruction is used for controlling the first virtual object to perform the target operation corresponding to the target operation controller, and the hit prompt information is used for indicating that the target operation hits the second virtual object. For example, referring to FIG. 5, after receiving the execution instruction of the target operation controller, the client converts the map display window 34 into a map display window 50, cancels the indication identifier 36 in the map display window 34, and converts a display style of the icon 35 of the second virtual object, to obtain an icon 51 of the second virtual object after the hit prompt information is added. The execution instruction of the target operation controller may be triggered to be generated when the client detects that the user stops the touch operation on the target operation controller. Because the virtual object may be moved, the hittable virtual object and a hit virtual object corresponding to the target operation may be the same or different.

According to an example embodiment, the map display window does not include the icons of the virtual objects in the virtual environment. The client may add the icon of the hittable virtual object to the map display window when marking the hittable virtual object, thereby marking the hittable virtual object. As shown in FIG. 4, when the touch operation for the target operation controller is not detected, the map display window 40 includes the first virtual building 41 and the second virtual building 42. After the touch operation for the target operation controller is detected, the map display window 40 is switched to a map display window 43, where the map display window 43 includes an icon 44 of a hittable virtual object. In this case, the foregoing operation 203 may include the following example operations:

Example operation 203-1b. Display the map display window.

According to an example embodiment, to reduce the processing overhead of the terminal, the client displays the map display window on the UI after detecting the touch operation of the target operation controller. The presentation picture corresponding to the map display window may be determined according to the effective range of the target operation. After determining the effective range of the foregoing target operation, the client determines a display range of the virtual environment map according to the effective range. The display range is used for indicating the display range of the virtual environment map corresponding to the map display window, and the display range is larger than the effective range. The client then determines the presentation picture corresponding to the map display window based on the display range, obtains a thumbnail parameter of the map display window, scales the presentation picture according to the thumbnail parameter to obtain the map display window, and displays the map display window. In this case, the map display window includes a complete virtual environment picture within the effective range, thereby ensuring the integrity of display information of the map display window. In addition, a virtual environment picture outside the effective range may not be displayed in the map display window, thereby reducing unnecessary overhead caused by scaling of an invalid picture. The thumbnail parameter is used for indicating a size ratio of the map display window to the presentation picture.

Example operation 203-2b. Obtain location information of the hittable virtual object.

After displaying the map display window, the client obtains the location information of the hittable virtual object. The method for determining the hittable virtual object is described in the embodiments of FIG. 2, so the details are not repeated herein.

Example operation 203-3b. Display an icon of the hittable virtual object in the map display window according to the location information of the hittable virtual object, and mark the icon of the hittable virtual object.

According to an example embodiment, after obtaining the location information of the hittable virtual object, the client determines whether the hittable virtual object is blocked by an obstacle according to the location information. If the hittable virtual object is not blocked by an obstacle, it is determined that the hittable virtual object is in a hittable and displayable state, and the icon of the hittable virtual object is displayed in the map display window, to mark the icon of the hittable virtual object. If the hittable virtual object is blocked by an obstacle, it is determined that the hittable virtual object is in a hittable and undisplayable state, and the icon of the hittable virtual object is not displayed in the map display window. If the hittable virtual object is blocked by an obstacle with a blocking effect, it is determined that the hittable virtual object is in an unhittable and undisplayable state, and the icon of the hittable virtual object is not displayed in the map display window.

In actual application, when obtaining the hittable virtual object, the client may directly obtain a virtual object in the hittable and displayable state as the hittable virtual object, and may directly display the icon of the hittable virtual object in the map display window according to the location information of the hittable virtual object after obtaining the location information of the hittable virtual object.

According to an example embodiment, the map display window may further display a thumbnail indication graph of the target operation. For example, after detecting the touch operation for the target operation controller, the client may display a thumbnail indication graph of the target operation in the map display window. The thumbnail indication graph is a simplified graphic representation of the indication graph in the map display window. As shown in FIG. 3, a thumbnail indication graph 37 in the map display window 33 is the indication graph 32 used for indicating the effective range in the UI 30. The specific example operations for obtaining the thumbnail indication graph are as follows:

Example operation 1 for obtaining the thumbnail indication graph: Obtain attribute information of the touch operation.

The attribute information of the touch operation is used for indicating a display style of the indication graph of the effective range of the target operation. After detecting the touch operation for the target operation controller, the client obtains the attribute information of the touch operation, where the attribute information includes a display size, a display position, and display texture of the indication graph.

Example operation 2 for obtaining the thumbnail indication graph: Generate a first graph parameter according to the attribute information of the touch operation.

The first graph parameter is used for indicating a display parameter of the thumbnail indication graph. The client may determine the display style of the indication graph in the display picture corresponding to the virtual environment according to the first graph parameter.

According to an example embodiment, after obtaining the attribute information of the touch operation, the client generates the first graph parameter according to the attribute information of the touch operation, and determines the display style of the indication graph indicated by the attribute information in the display picture corresponding to the virtual environment according to the first graph parameter.

Example operation 3 for obtaining the thumbnail indication graph: Determine a second graph parameter based on the first graph parameter.

The second graph parameter is used for indicating a display parameter of the thumbnail indication graph. The client may determine a display style of the thumbnail indication graph in the map display window according to the second graph parameter.

According to an example embodiment, after generating the first graph parameter, the client determines the second graph parameter according to the first graph parameter and a scaling coefficient of the map display window, and displays the thumbnail indication graph of the target operation in the map display window according to the second graph parameter.

According to another example embodiment, the client determines the display style of the indication graph in the display picture corresponding to the virtual environment based on the first graph parameter, and maps the display style of the indication graph in the display picture corresponding to the virtual environment to the map display window according to the scaling coefficient of the map display window.

Figure 6:
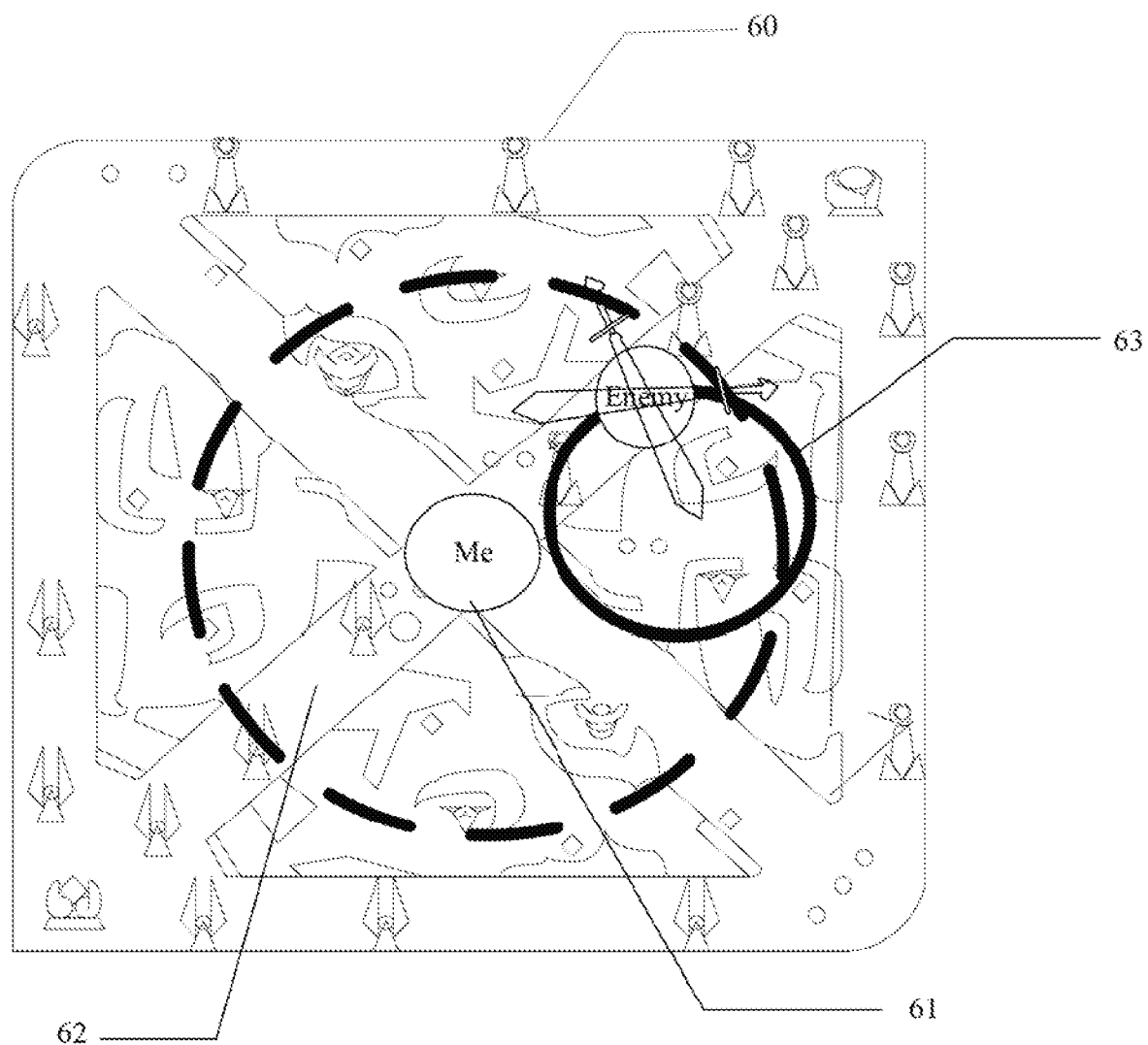

According to another example embodiment, different target operations correspond to different thumbnail indication graphs. For example, if the target operation is a directional operation, the thumbnail indication graph includes a linear graph that uses an icon of the first virtual object as a starting point and that points to a selected direction of the target operation, as the thumbnail indication graph 37 shown in FIG. 3. According to another example, if the target operation is a positional operation, the thumbnail indication graph includes: a range prompt graph that uses an icon of the first virtual object as a center and that corresponds to the effective range of the target operation, and a location prompt graph corresponding to a selected execution location of the target operation. The range prompt graph is used for prompting the effective range of the target operation, and the location prompt graph is used for prompting an influence location of the target operation in the virtual environment. For example, referring to FIG. 6, the map display window 60 includes an icon 61 of the first virtual object, a range prompt graph 62, and a location prompt graph 63.

To ensure the accuracy of the display of the map display window, the client may need to update data of each frame of the display picture corresponding to the virtual environment, and update the map display window by using the updated data. For example, the client may obtain movement data of a virtual object and location adjustment data of a target operation in real time. According to the movement data of the virtual object, the hittable virtual object in the map display window is updated, marking of the hittable virtual object that moves out of the effective range is canceled, and the hittable virtual object that moves into the effective range is marked. Correspondingly, according to the location adjustment data of the target operation, the location of the thumbnail indication graph in the map display window is updated, an effective range after the update is determined, and the hittable virtual object after the location adjustment is marked according to the updated effective range. The location adjustment data of the target operation may be data acquired from a location adjustment region of the target operation. For example, the user generates the location adjustment data of the target operation through a sliding instruction for the location adjustment region of the target operation, and correspondingly, the client obtains the location adjustment data.

According to an example embodiment, a minimap manager may be provided in the application. The user of the minimap manager manages the map display window, such as controlling display and disappearance of the thumbnail indication graph in the map display window, and the controlling display and disappearance of the hittable prompt information. For example, referring to FIG. 7 and FIG. 8, the minimap manager is described according to example embodiments.

Figure 7:
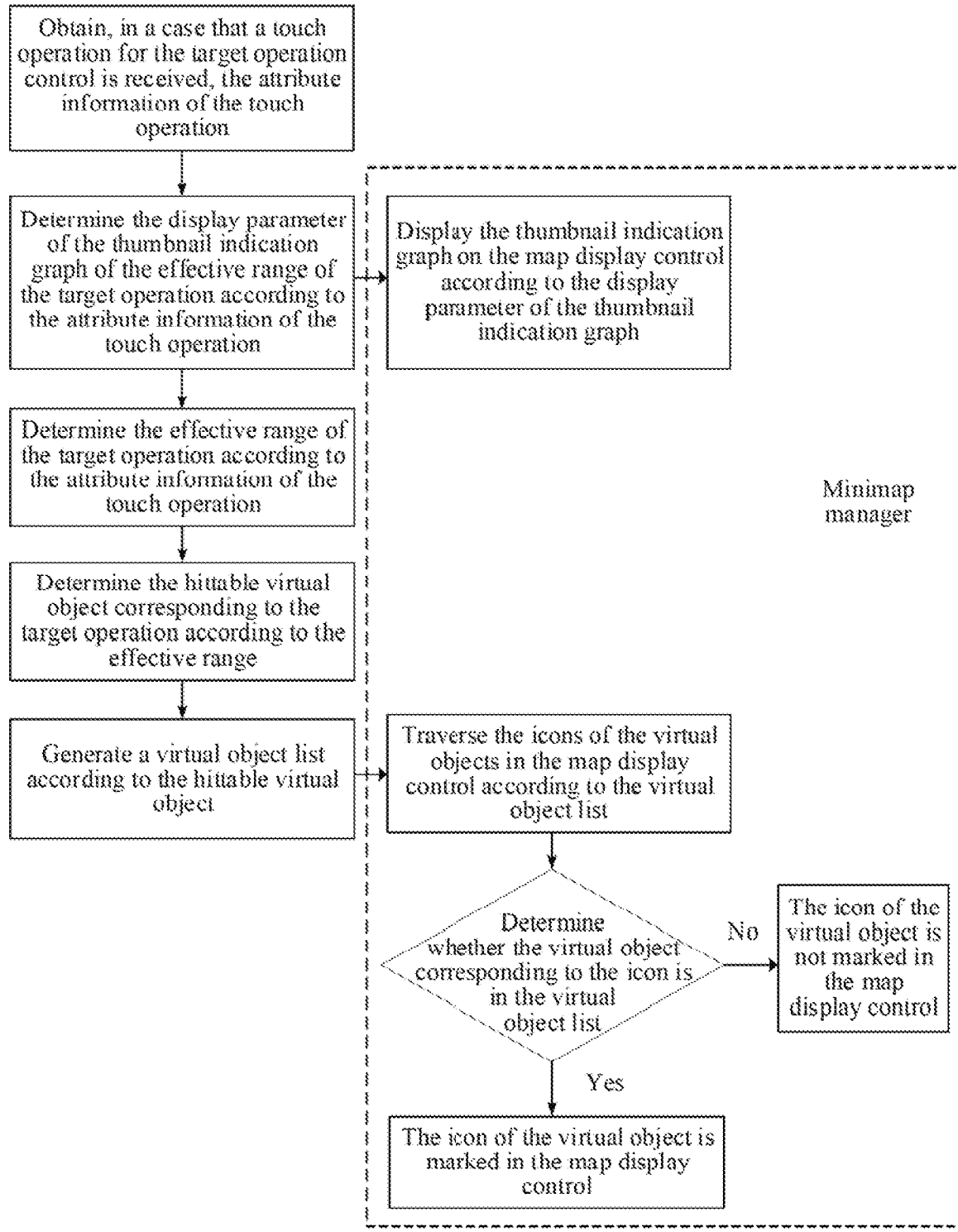
FIG. 7 is a schematic exemplary diagram of an execution flow of a minimap manager according to example embodiments.

For example, when the touch operation for the target operation controller is detected, the minimap manager performs the operations shown in FIG. 7. When receiving the touch operation for the target operation controller, the client obtains the attribute information of the touch operation, and determines the display parameter of the thumbnail indication graph of the effective range of the target operation according to the attribute information of the touch operation; and the minimap manager displays the thumbnail indication graph on the map display window according to the display parameter of the thumbnail indication graph. The client then determines the effective range of the target operation according to the attribute information of the touch operation, determines the hittable virtual object corresponding to the target operation according to the effective range, and generates a virtual object list according to the hittable virtual object; and the minimap manager traverses the icons of the virtual objects in the map display window according to the virtual object list, to determine whether the virtual object corresponding to the icon is in the virtual object list. If the virtual object corresponding to the icon is in the virtual object list, the icon of the virtual object is marked in the map display window; and if the virtual object corresponding to the icon is not in the virtual object list, the icon of the virtual object is not marked in the map display window.

Figure 8:
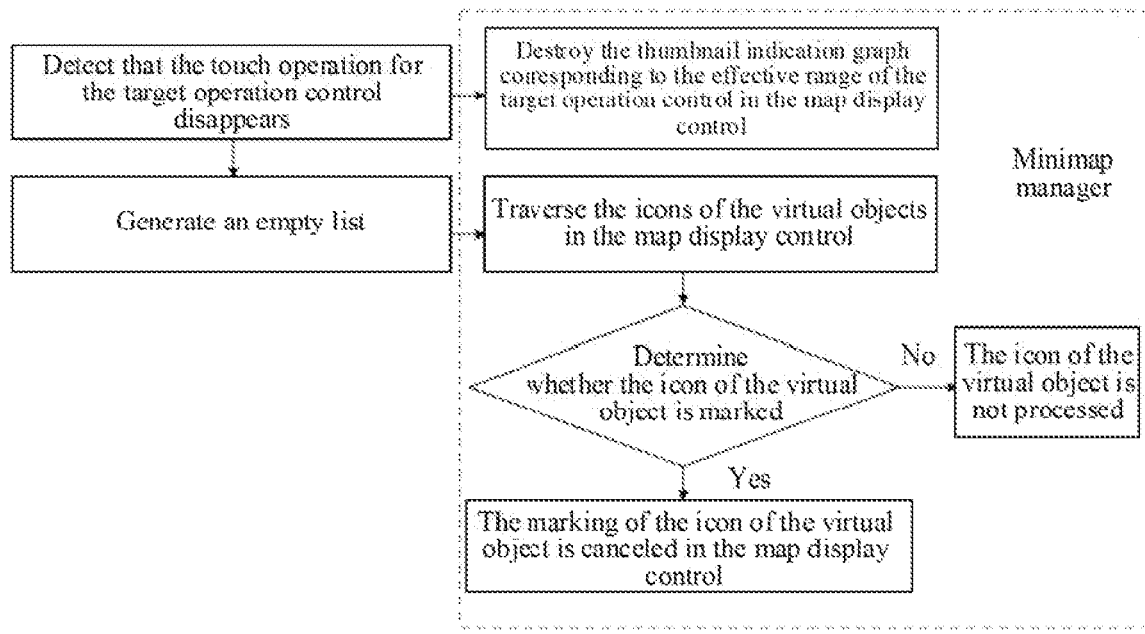
FIG. 8 is a schematic exemplary diagram of an execution flow of another minimap manager according to example embodiments.

For example, when it is detected that the touch operation for the target operation controller disappears, the minimap manager performs the steps shown in FIG. 8. The client detects that the touch operation for the target operation controller disappears, and the minimap manager destroys the thumbnail indication graph corresponding to the effective range of the target operation controller in the map display window. The client then generates an empty list; and the minimap manager traverses the icons of the virtual objects in the map display window, and determines whether the icon of the virtual object is marked. If the icon of the virtual object is marked, the marking of the icon of the virtual object is canceled in the map display window; and if the icon of the virtual object is not marked, the icon of the virtual object is not processed.

The following is an apparatus according to example embodiments which may be used for performing the method embodiments. For details not disclosed in the apparatus embodiment, reference may be made to the method embodiments.

Figure 9:
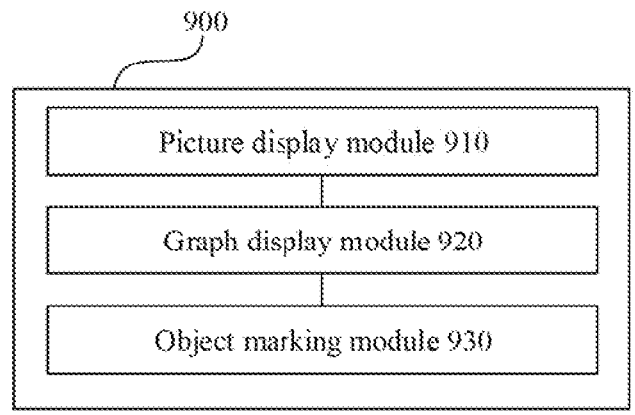
FIG. 9 is a block diagram of an interface display apparatus according to example embodiments.

FIG. 9 is a block diagram of an interface display apparatus according to example embodiments. The apparatus has functions of implementing the foregoing interface display method. The functions may be implemented by hardware, or may be implemented by hardware executing corresponding software. The apparatus may be a terminal or may be disposed in a terminal. The apparatus 900 may include a picture display module 910, a graph display module 920, and an object marking module 930.

The picture display module 910 may be configured to display a display picture corresponding to a virtual environment and a target operation controller, the target operation controller being configured to control a first virtual object to perform a target operation.

The graph display module 920 may be configured to display an indication graph of the target operation in the display picture in response to detecting a touch operation for the target operation controller, the indication graph being used for indicating an effective range of the target operation.

The object marking module 930 may be configured to mark, in a case that there is a hittable virtual object in the effective range of the target operation, the hittable virtual object in a map display window, the map display window being a UI control for displaying a virtual environment map.

According to an example embodiment, the object marking module 930 includes a first display unit.

The first display unit may be configured to display hittable prompt information corresponding to an icon of a second virtual object in the map display window, the hittable prompt information being used for indicating that the second virtual object is the hittable virtual object.

According to an example embodiment, the object marking module 930 further includes an information cancellation unit.

The information cancellation unit may be configured to cancel the display of the hittable prompt information corresponding to the icon of the second virtual object in the map display window in a case that the second virtual object is not the hittable virtual object.

According to an example embodiment, the object marking module 930 further includes a second display unit.

The second display unit may be configured to display hit prompt information corresponding to the icon of the second virtual object in the map display window in response to an execution instruction for the target operation, the hit prompt information being used for indicating that the target operation hits the second virtual object.

According to an example embodiment, the object marking module 930 further includes a list determining unit, a list obtaining unit, a list traversing unit, and a step execution unit.

The list determining unit may be configured to determine a virtual object list according to location information of virtual objects in the virtual environment and the effective range of the target operation, the virtual object list including a target virtual object located in the effective range of the target operation.

The list obtaining unit may be configured to obtain a list of icons in a display state in the map display window, the list of icons including icons of virtual objects.

The list traversing unit may be configured to traverse the virtual objects corresponding to the icons in the list of icons, and to determine whether a virtual object corresponding to an icon in the list of icons is in the virtual object list.

The step execution unit may be configured to determine that the virtual object corresponding to the icon is the second virtual object in a case that the virtual object corresponding to the icon is in the virtual object list, and perform the operation of displaying hittable prompt information corresponding to an icon of a second virtual object in the map display window.

Figure 10:
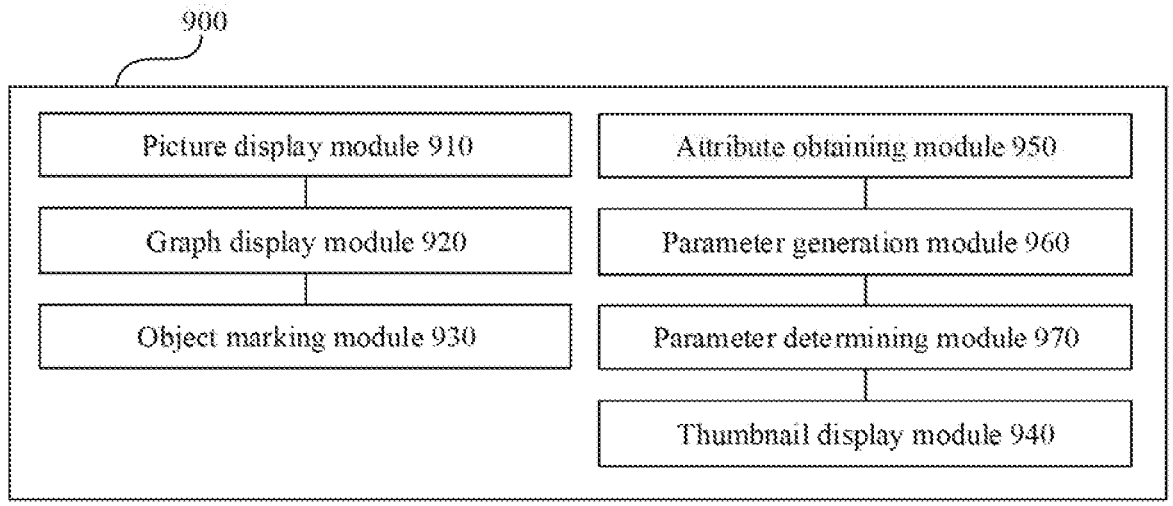
FIG. 10 is a block diagram of an interface display apparatus according to example embodiments.

FIG. 10 is a block diagram of an apparatus according to example embodiment. As shown in FIG. 10, the apparatus 900 may further include a thumbnail display module 940.

The thumbnail display module 940 may be configured to display a thumbnail indication graph of the target operation in the map display window in response to detecting the touch operation for the target operation controller, the thumbnail indication graph being a simplified graphic representation of the indication graph in the map display window.

According to an example embodiment, in a case that the target operation is a directional operation, the thumbnail indication graph includes a linear graph that uses an icon of the first virtual object as a starting point and that points to a selected direction of the target operation.

According to an example embodiment, in a case that the target operation is a positional operation, the thumbnail indication graph includes: a range prompt graph that uses an icon of the first virtual object as a center and that corresponds to the effective range of the target operation, and a location prompt graph corresponding to a selected execution location of the target operation.

According to an example embodiment, as shown in FIG. 10, the apparatus 900 may further include an attribute obtaining module 950, a parameter generation module 960, and a parameter determining module 970.

The attribute obtaining module 950 may be configured to obtain attribute information of the touch operation.

The parameter generation module 960 may be configured to generate a first graph parameter according to the attribute information of the touch operation, the first graph parameter being used for indicating a display parameter of the indication graph.

The parameter determining module 970 may be configured to determine a second graph parameter based on the first graph parameter, the second graph parameter being used for indicating a display parameter of the thumbnail indication graph.

According to an example embodiment, the object marking module 930 includes a map display unit, a location obtaining unit, and an icon display unit.

The map display unit may be configured to display the map display window.

The location obtaining unit may be configured to obtain location information of the hittable virtual object.

The icon display unit may be configured to display an icon of the hittable virtual object in the map display window according to the location information of the hittable virtual object, and mark the icon of the hittable virtual object.

According to an example embodiment, the map display unit is configured to: determine a display range of the virtual environment map according to the effective range, the display range being larger than the effective range; determine a presentation picture corresponding to the map display window based on the display range; obtain a thumbnail parameter of the map display window, the thumbnail parameter being used for indicating a size ratio of the map display window to the presentation picture; scale the presentation picture according to the thumbnail parameter, to obtain the map display window; and display the map display window.

As such, in a case that there is a hittable virtual object in the effective range of the target operation, the hittable virtual object may be marked in the map display window, to implement visualization of the hittable virtual object corresponding to the target operation in the map display window, to provide a possibility for the target operation to accurately hit a virtual object outside a screen display picture, to reduce interactions between a user and the terminal, greatly reduce resource consumption of the terminal, and to improve a running speed of the game. In addition, due to the visualization of the hittable virtual object corresponding to the target operation in the map display window, sliding operations of the user on the display picture when attacking a hostile virtual object outside the screen display picture are reduced. The operation is simple and may be performed quickly. The user can directly obtain an influence target of the target operation by using the map display window, reducing a probability of an operation error of the target operation, and ensuring the accuracy of the target operation.

When the apparatus provided in the foregoing example embodiments may implement functions of the apparatus, the division of the foregoing functional modules is merely an example for description. In the practical application, the functions may be assigned to and completed by different functional modules according to the requirements, that is, the internal structure of the device may be divided into different functional modules, to implement all or some of the functions described above. In addition, the apparatus and method embodiments provided in the foregoing embodiments may belong to the same conception. For the specific implementation process, reference may be made to the method embodiments, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 11:
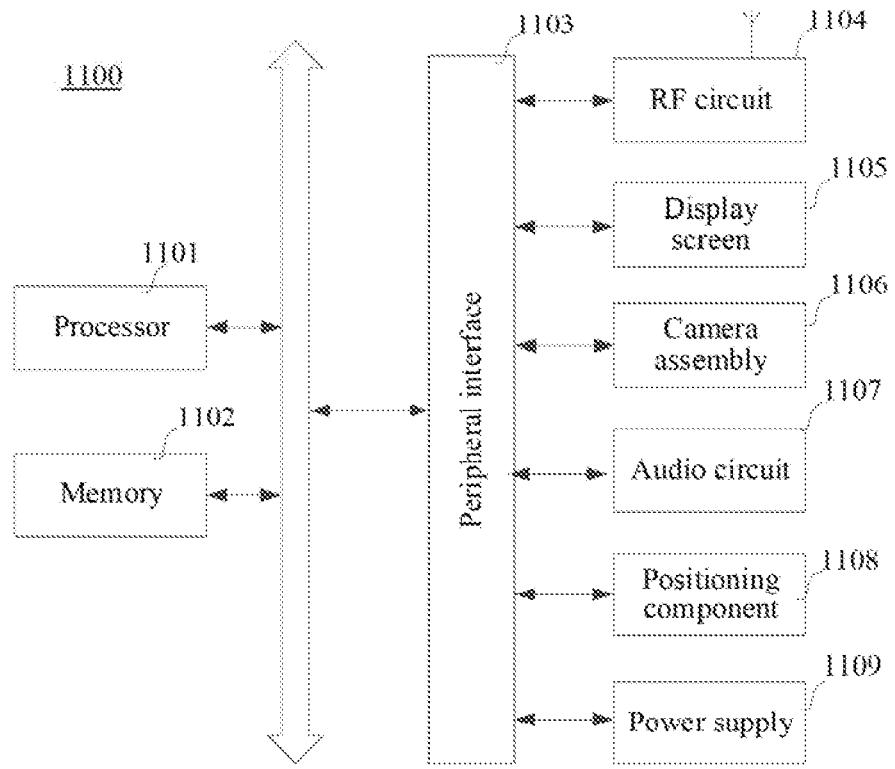
FIG. 11 is a structural block diagram of a terminal according to example embodiments.

FIG. 11 is a structural block diagram of a terminal 1100 according to example embodiment. The terminal 1100 may be an electronic device such as a mobile phone, a tablet computer, a game console, an ebook reader, a multimedia player, a wearable device, or a PC. The terminal may perform the interface display method. The terminal may be the terminal 10 in the game running environment shown in FIG. 1.

The terminal 1100 may include a processor 1101 and a memory 1102.

The processor 1101 may include one or more processing cores. For example, the processor may be a 4-core processor or an 8-core processor. The processor 1101 may be implemented by using at least one hardware form of a digital signal processor (DSP), a field programmable gate array (FPGA), and a programmable logic array (PLA). The processor 1101 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1101 may be integrated with a graphics processing unit (GPU). The GPU is configured to render and draw content that needs to be displayed on a display. In some embodiments, the processor 1101 may further include an artificial intelligence (AI) processor. The AI processor is configured to process computing operations related to machine learning.

The memory 1102 may include one or more computer-readable storage media that may be non-transitory. The memory 1102 may further include a high-speed random access memory (RAM) and a non-volatile memory, such as one or more magnetic disk storage devices or flash storage devices. In some embodiments, the non-transient computer-readable storage medium in the memory 1102 is configured to store at least one instruction, at least one program, a code set, or an instruction set, the at least one instruction, the at least one program, the code set, or the instruction set being configured to be executed by one or more processors to implement the foregoing interface display method.

According to some example embodiments, the terminal 1100 may alternatively include: a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral includes at least one of a radio frequency (RF) circuit 1104, a display screen 1105, a camera component 1107, an audio circuit 1107, a positioning component 1108, and a power supply 1109.

A person skilled in the art may understand that the structure shown in FIG. 11 constitutes no limitation on the terminal 1100, and the terminal may include more or fewer components than those shown in the figure, or some components may be combined, or a different component deployment may be used.

According to an example embodiment, a computer-readable storage medium may be further provided, the storage medium storing at least one instruction, at least one program, a code set, or an instruction set, the at least one instruction, the at least one program, the code set, or the instruction set, when executed by the processor, implementing the foregoing interface display method.

The computer-readable storage medium may include: a read-only memory (ROM), a RAM, a solid state drive (SSD), an optical disc, or the like. The RAM may include a resistance random access memory (ReRAM) and a dynamic random access memory (DRAM).

According to an example embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing interface display method.

It is to be understood that "plurality of" mentioned in this specification means two or more. And/or describes an association relationship for associated objects and represents that three relationships may exist. For example, "A and/or B," "one or more of A and B," "or one or more of A or B" may represent the following three cases: only A exists, both A and B exist, and only B exists. The character "/" generally indicates an "or" relationship between the associated objects. In addition, the step (or operations) numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure, but are not limited by the example embodiments.

Also, it is to be understood that the terms "include" or "have" are intended to indicate the existence of elements disclosed in the specification, and are not intended to preclude the possibility that one or more other elements may exist or may be added.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method of controlling a display that is performed by at least one processor, the method comprising:
    displaying a virtual environment and a target operation controller, the target operation controller being configured to control a first virtual object to perform a target operation;
    displaying an indication graph of the target operation in response to a touch operation to the target operation controller, the indication graph indicating an effective range of the target operation; and
    marking, based on a hittable virtual object being in the effective range of the target operation, the hittable virtual object in a map display window, the map display window displaying a map of the virtual environment,
    wherein the marking the hittable virtual object in the map display window comprises displaying hittable prompt information corresponding to an icon of a second virtual object in the map display window,
    wherein the hittable prompt information indicates that the second virtual object is the hittable virtual object.

2. The method according to claim 1, further comprising, after the displaying the hittable prompt information in the map display window, ending the display of the hittable prompt information in the map display window based on the second virtual object no longer being hittable.

3. The method according to claim 1, further comprising, after the displaying the hittable prompt information in the map display window, displaying hit prompt information corresponding to the icon of the second virtual object in the map display window in response to an execution instruction for the target operation,
    wherein the hit prompt information indicates that the target operation hits the second virtual object.

4. The method according to claim 1, further comprising, before the displaying the hittable prompt information in the map display window:
    determining a virtual object list according to location information of virtual objects in the virtual environment and the effective range of the target operation, the virtual object list comprising a target virtual object located in the effective range of the target operation;
    obtaining a list of icons displayed in the map display window, the list of icons comprising icons of virtual objects;
    determining whether a virtual object corresponding to an icon in the list of icons is in the virtual object list;
    determining that the virtual object corresponding to the icon is the second virtual object based on the virtual object corresponding to the icon being in the virtual object list, and
    performing the operation of displaying the hittable prompt information corresponding to the icon of the second virtual object in the map display window.

5. A method of controlling a display that is performed by at least one processor, the method comprising:
    displaying a virtual environment and a target operation controller, the target operation controller being configured to control a first virtual object to perform a target operation;
    displaying an indication graph of the target operation in response to a touch operation to the target operation controller, the indication graph indicating an effective range of the target operation;
    marking, based on a hittable virtual object being in the effective range of the target operation, the hittable virtual object in a map display window, the map display window displaying a map of the virtual environment; and
    displaying a thumbnail indication graph of the target operation in the map display window in response to the touch operation for the target operation controller,
    the thumbnail indication graph being a graphic representation of the indication graph.

6. The method according to claim 5, wherein based on the target operation being a directional operation, the thumbnail indication graph comprises a linear graph that uses an icon of the first virtual object as a starting point and extends towards a selected direction of the target operation.

7. The method according to claim 5, wherein based on the target operation being a positional operation, the thumbnail indication graph comprises:
    a range prompt graph that uses an icon of the first virtual object as a center and extends out from the center based on the effective range of the target operation; and
    a location prompt graph corresponding to a selected execution location of the target operation.

8. The method according to claim 5, further comprising, before the displaying the thumbnail indication graph of the target operation in the map display window:
    obtaining attribute information of the touch operation;
    generating a first graph parameter according to the attribute information of the touch operation, the first graph parameter indicating a display parameter of the indication graph; and
    determining a second graph parameter based on the first graph parameter, the second graph parameter indicating a display parameter of the thumbnail indication graph.

9. A method of controlling a display that is performed by at least one processor, the method comprising:
- displaying a virtual environment and a target operation controller, the target operation controller being configured to control a first virtual object to perform a target operation;
- displaying an indication graph of the target operation in response to a touch operation to the target operation controller, the indication graph indicating an effective range of the target operation; and
- marking, based on a hittable virtual object being in the effective range of the target operation, the hittable virtual object in a map display window, the map display window displaying a map of the virtual environment,
- wherein the marking the hittable virtual object in the map display window comprises:
  - displaying the map display window;
  - obtaining location information of the hittable virtual object; and
  - displaying an icon of the hittable virtual object in the map display window according to the location information of the hittable virtual object, and marking the icon of the hittable virtual object.

10. The method according to claim 9, wherein the displaying the map display window comprises:
- determining a display range of the map of the virtual environment according to the effective range of the target operation, the display range being larger than the effective range of the target operation;
- determining a presentation picture for the map display window based on the display range;
- obtaining a thumbnail parameter of the map display window, the thumbnail parameter indicating a size ratio of the map display window to the presentation picture;
- scaling the presentation picture according to the thumbnail parameter, to obtain the map display window; and
- displaying the map display window.

11. A display apparatus, the display apparatus comprising:
- at least one memory configured to store computer program code; and
- at least one processor configured to access the at least one memory and operate according to the computer program code, the computer program code comprising:
  - a first display code configured to cause the at least one processor to display a virtual environment and a target operation controller, the target operation controller being configured to control a first virtual object to perform a target operation;
  - a second display code configured to cause the at least one processor to display an indication graph of the target operation in response to a touch operation to the target operation controller, the indication graph indicating an effective range of the target operation; and
  - a marking code configured to cause the at least one processor to mark, based on a hittable virtual object being in the effective range of the target operation, the hittable virtual object in a map display window, the map display window displaying a map of the virtual environment,
- wherein the marking code is further configured to cause the at least one processor to display hittable prompt information corresponding to an icon of a second virtual object in the map display window, and
- wherein the hittable prompt information indicates that the second virtual object is the hittable virtual object.

12. The display apparatus according to claim 11, further comprising first ending code configured to cause the at least one processor to, after the displaying the hittable prompt information in the map display window, end the display of the hittable prompt information in the map display window based on the second virtual object is no longer being hittable.

13. The display apparatus according to claim 11, further comprising third displaying code configured to cause the at least one processor to, after the displaying the hittable prompt information in the map display window, display hit prompt information corresponding to the icon of the second virtual object in the map display window in response to an execution instruction for the target operation,
- wherein the hit prompt information indicates that the target operation hits the second virtual object.

14. A terminal comprising a display apparatus, at least one processor, and a memory, the memory storing at least one instruction, at least one program, a code set, or an instruction set, the at least one instruction, the at least one program, the code set, or the instruction set being loaded and executed by the at least one processor to implement the method according to claim 1.

15. A non-transitory computer-readable storage medium storing instructions that cause a processor of a display apparatus to:
- display a virtual environment and a target operation controller, the target operation controller being configured to control a first virtual object to perform a target operation;
- display an indication graph of the target operation in response to a touch operation to the target operation controller, the indication graph indicating an effective range of the target operation; and
- mark, based on a hittable virtual object being in the effective range of the target operation, the hittable virtual object in a map display window, the map display window displaying a map of the virtual environment,
- wherein the marking the hittable virtual object in the map display window comprises displaying hittable prompt information corresponding to an icon of a second virtual object in the map display window, and
- wherein the hittable prompt information indicates that the second virtual object is the hittable virtual object.

16. The non-transitory computer-readable storage medium according to claim 15, wherein the instructions further cause the processor to, after the displaying the hittable prompt information in the map display window, end the display of the hittable prompt information in the map display window based on the second virtual object is no longer being hittable.

17. The non-transitory computer-readable storage medium according to claim 15, wherein the instructions further cause the processor to, after the displaying the hittable prompt information in the map display window, display hit prompt information corresponding to the icon of the second virtual object in the map display window in response to an execution instruction for the target operation,
- wherein the hit prompt information indicates that the target operation hits the second virtual object.

* * * * *